March 4, 1947.                D. S. ANTHONY                2,416,975
                                TOOL HOLDER
                        Filed Sept. 4, 1943          2 Sheets-Sheet 1

INVENTOR.
DAVID S. ANTHONY
BY Lester B. Clark
ATTORNEY.

Patented Mar. 4, 1947

2,416,975

UNITED STATES PATENT OFFICE 2,416,975

TOOLHOLDER

David S. Anthony, San Antonio, Tex., assignor to Anthony Tool Co., San Antonio, Tex.

Application September 4, 1943, Serial No. 501,215

2 Claims. (Cl. 29—96)

The invention relates to a cutting off blade for lathes, shapers, planers and the like, and a holder therefor.

The invention relates generally to the structure of my prior patent, Reissue 21,877, dated August 19, 1941, for a Tool holder.

The present invention directs itself to a unitary blade which has a substantial depth as compared with its thickness so as to provide an integral cantilever construction in the form of a blade which is supported in a holder, but which can extend a substantial distance outwardly therefrom and have sufficient strength to withstand the stress of cutting at a high rate of speed or when using a deep feed.

In the prior patent above referred to a somewhat standard type of blade was used in combination with a separate and independent support member. The usual ratio of depth to width in lathe cutting tools has heretofore approximated six to one, but the present blade may be said to approximate a ratio of eleven to one so that it might be said that a deep thin blade has been provided. The advantages of such a blade reside in the fact that a narrow cut is made so that a minimum amount of material is cut away and the cut off portion can then be utilized for other purposes rather than being machined away as is now the usual practice.

A thin blade, half the thickness of an ordinary blade, offers just half the resistance in cutting off, reducing the power consumed, waste material in the form of chips and strain on the cutter blade, chuck of lathe and tool post. A deep blade two or three times greater than the ordinary blade has two or three times the vertical strength of the ordinary blade. These features enable the deep, thin blade to make deep, heavy cuts and cuts of larger diameter stock, impossible to make with the ordinary cutter blade.

Heretofore without the special holder of my prior patent it has been impossible to use a deep blade to extend below the bottom of the turret slot or below the top of the cross slide on engine lathes because of insufficient clearance for the blade, but with my particular holder it is possible to allow the blade to extend below the slot on the slide and in this manner a unitary blade can be used having a depth which exceeds the distance between the center of the lathe spindle and the bottom of the turret slot or the top of the cross slide of turret and engine lathes respectively.

It is, therefore, one of the objects of the present invention to provide a deep, thin cutting off blade for lathes, shapers, planers and the like.

Another object of the invention is to provide a deep, thin cutting off blade for lathes which can be supported in a holder to extend below the elevation of the turret block on a turret lathe.

Another object of the invention is to provide an integral cutting off blade having a substantial depth as compared with its thickness which has an insert of hard wear resistant material applied thereto.

Still another object of the invention is to provide a deep cutting off blade which has a minimum taper to provide for clearance.

Still another object of the invention is to provide a cutting off blade of an integral piece of material which is of a width substantially greater than the distance between the center line of a lathe spindle and the bottom of a slot in the turret post or the top of the cross slide of engine lathes.

Still another object of the invention is to provide a holder for a thin deep cutting off blade for lathes.

Still another object of the invention is to provide a cover plate for cutting off blade holders so as to enclose the blade.

Another object of the invention is to provide a cutting off blade holder for lathes which depends from the trunnion seat of the shank member of the tool holder, which shank member fits into the slot of the lathe.

Other and further objects of the invention will be readily apparent when the following description is considered in connection with the accompanying drawings wherein:

Fig. 4 is a section taken on the line 4—4 of Fig. 2.

Fig. 5 is a section taken on the line 5—5 of Fig. 2.

Fig. 6 is a side elevation of one of the deep wide blades.

Fig. 7 is a top plan view looking down on the blade of Fig. 6 and illustrating the taper thereof.

Fig. 8 is an elevation looking at the front end of the blade of Fig. 6.

As no blade in a lathe or other machine can be used to execute a cut above the center line of lathe spindle, and as all other standard blades are held within the shank of holder, which rests within the slot of square tool post, and all special forged blades rest upon the base of the slot of the square tool post, it is readily apparent that the maximum depth of all ordinary blades is the distance from spindle center to the base of the slot in square tool post. The shank of the present tool holder fills the slot in the square tool post, and the deep, thin blade extends far below the base of the slot of the tool post and is firmly held in the holding member of the tool holder, which is affixed to the shank member. It is evident that by this combination of an ordinary sized shank member and extraordinary deep holder member, this thin deep blade extends far below any other blade which could be fitted into the lathe, thereby giving to this blade the unusual feature of great strength, due to the extraordinary depth of blade, which is at the same time unusually thin. In brief, by extending from spindle center to a point far below the slot in the square tool post, this new blade is different from all other blades heretofore used, with the consequent gain in new, useful and valuable features.

Figure 3:
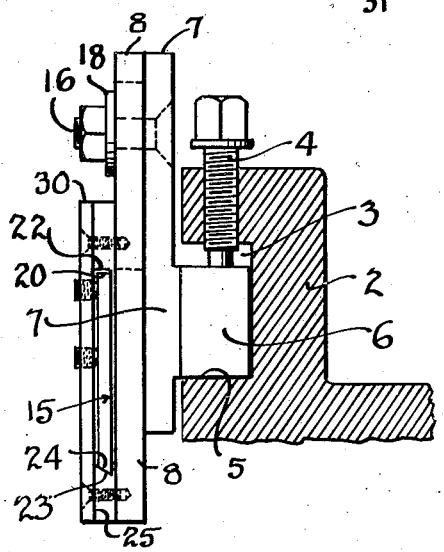
Fig. 3 is a rear end view of the holder supported in the turret block with the turret block in section.

In the use of turret or engine lathes and shapers or planers the usual practice is to affix the blade or other tool directly to the turret blocks 2 which is seen in Fig. 3 or in the slot of the tool post of the cross slide of an engine lathe or shaper.

While the invention may be used in various types of machines, it will be particularly described in connection with a turret lathe or an engine lathe.

As is well understood this turret block is capable of supporting or carrying a number of tools which can be turned from active to inactive position in performing different operations on the lathe. This block is usually provided with a recess 3 and a locking screw 4 by which the blade or other tool is affixed to the block 2.

Figure 1:
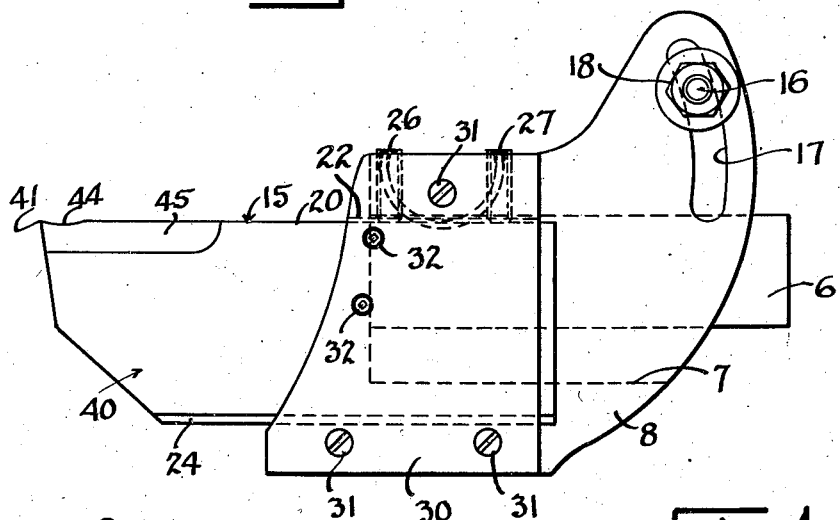
Fig. 1 is a side elevation of the holder and blade assembled together.

Such an arrangement, however, prevents the use of a tool or blade which extends below the elevation of the base 5 of the slot or recess 3 as mentioned above and in my prior patent there is disclosed a holder having a shank 6 which is arranged to fit in the recess 3 and which carries a base block 7 which extends laterally from the turret block 2. Adjustably mounted upon this base 7 is the holder member 8 as best seen in Fig. 1. This holder member carries a stud 9 which is arranged to fit in the trunnion seat 10 in the base 7. As best seen in Figs. 1, 2, 4 and 5 this stud 9 is of a circular dovetail construction so as to fit in the corresponding trunnion seat 10 so that the support 8 can pivot about the base 7 in order to determine the angularity of the cutting blade 15 which is carried by the support 8. This angular adjustment is controlled by a bolt 16 carried in the base 7 as seen in Fig. 4 and which projects through a slot 17 in the support 8 so that the washer and nut assembly 18 on the bolt 16 may be tightened to hold the support block 8 at the desired angle. This arrangement is seen in Fig. 1. It will be particularly noted that the support 8 is depending along the outside of the turret block 2 so that the top edge 20 of the cutter blade 15 is at the same elevation as would be the usual tool or blade which would have been deposited in the slot 3 of the turret block, namely, at the level of the spindle center of the lathe. The depending arrangement of the base 7 and support 8, however, accommodates the excessive depth of the blade 15 as best seen in Fig. 3 so that the blade may depend any desired distance below the base of the turret block slot 3 which was the lower limit with prior blades.

Figure 2:
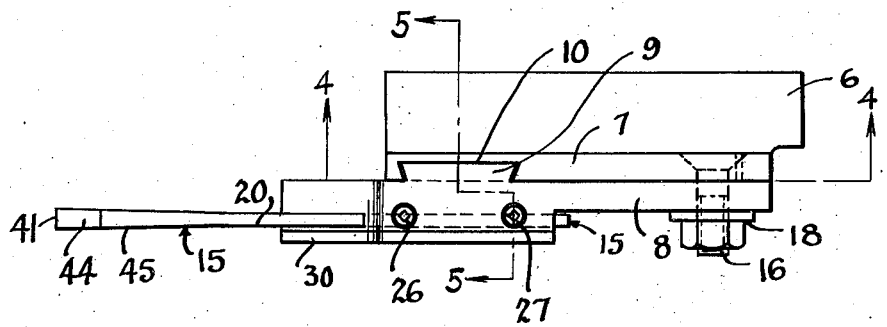
Fig. 2 is a top plan view looking down on the holder and blade.

As seen in Fig. 3 also it will be observed that the support 8 is provided with a relatively shallow but deep recess 22 in the front face thereof and that this recess has an inwardly inclined beveled seat 23 in the base thereof which is arranged to receive the complementary tapered bottom edge 24 of the cutter blade 15. In this manner the blade is set into the support so that it will not extend beyond the outer edge 25 of the support. The blade can be clamped against vertical movement by the set screws 26 and 27 as best seen in Figs. 1 and 2 which extend through the top of the support 8. In order to firmly clamp the blade against lateral or vertical movement the plugs 27' are slidably disposed in the block 8 to bear against the upper edge 20 of the cutter blade as best seen in Fig. 5 at 28. The front plunger may have an inclined lower face to urge the top of the blade back in the recess 22. These plungers may be vertically slotted to receive a small pin so as to hold them against turning.

In order to provide for further alignment and accuracy in maintaining the cutter blade 15 in proper position, a face plate 30 has been provided which is of the same shape and configuration as the forward face of the support 8 as best seen in Fig. 1. This plate overlaps the blade 15 and the recess 22 and may be affixed to the support by a plurality of screws or other members 31 at the top and bottom of the support.

In order to hold the blade 15 in exact vertical alignment and firmly seated in the recess 22 a plurality of set screws or clamping devices 32 may be carried by the face plate and arranged to abut the side of the blade when the tool and blade are assembled in Fig. 1.

The blade itself is best seen in Figs. 6, 7 and 8 and comprises a body 40 of any desired suitable material, but preferably a steel of a suitable composition which will have sufficient strength when arranged in the proportions about to be described so that it will withstand the cutting stresses when positioned as a cantilever in the holder as seen in Fig. 1.

As indicated above, the usual type of cutting off tools have heretofore been constructed with a ratio of depth to width approximating six to one, but it will be observed from Fig. 8 that the blade 40 has a substantial depth as compared with its thickness so that it might be designated as a deep, thin blade and for purposes of illustration, but not limitation, it may be pointed out that the ratio of depth to width may be as much as sixteen to one. Preferably the blade is of such depth that it extends from the lathe spindle center to well below the base 5 of the slot 3 in turret lathes and below the top of the cross slide on engine lathes.

In my prior patent the blade was of a substantially standard configuration and then a support was provided underneath it to furnish enough strength to withstand the cutting stresses, but in the present blade one integral member has been provided which results in economical construction, facilitates operation by the affixing and releasing of but a single member and avoids any opportunity of error or slippage in the positioning of two parts rather than one. As seen in Fig. 8 the lower beveled edge 24 is arranged to engage the seat 23 in the holder and the upper forward edge or cutting corner 41 of the blade is slightly wider than the thickness 42 of the body of the blade. The upper edge 20, therefore, merges with the inclined tapered areas 43 into the thickness of the blade not only in a vertical direction as seen in Fig. 8, but in a longitudinal direction as well as seen in Fig. 7. The blade may or may not be provided with the depression 44 to facilitate the escape of the cuttings. The entire body of the blade may be made of a suitable material for the cutting operation, but it has been found commercially practical to utilize a lower grade of steel or other material in making up the body 40 and to then weld or otherwise affix an insert 45 adjacent the cutting area or corner of the blade. Such an insert is seen in Fig. 6 and is shown of substantial length and as having been welded into the cut away portion 46 of the blade. This insert may be of any desired material adapted for the purpose for which the blade is to be used. These materials are available under various trade names and include the boron, carbide and like alloys. The insert 45 may be very short if desired and approximate the length of the depression 44.

A unitary blade may be entirely of high speed steel with the double beveled sides extending only a short distance down to give side clearance, below which point the sides are parallel. This applies also to an insert of hard wear resistant material which has only the side clearance. This is shown in the drawing of the deep thin cutting blade in Figs. 6 and 8. Another type of unitary blade is made with an insert of hard wear resistant material, which is wider at the cutting end, and has a back taper in addition to the double bevel, to give side clearance as seen in Fig. 7.

The blades may be made with the double bevel in which case the thicker top edge of blade merges with the thickness 42 of the body of the blade through the entire length of the blade, or the front cutting edge of the blade may be thicker than the body of the blade 42 and tapered back to merge with the thickness of the body of the blade 42 as seen in Fig. 7.

An integral blade of this sort has been found to be particularly economical and of substantial advantage in making heavy cuts of large diameter shafts and the like so as to salvage the part being cut off in one integral piece which can be used for some other purpose. A minimum amount of material is cut away due to the thinness of the cutting blade and yet the blade can make a very deep cut over a large radius due to the fact that the blade is deep and provides a cantilever beam construction to resist the cutting stresses, permitting cuts to be made with a much heavier feed and at greater speed.

Broadly the invention contemplates a deep, thin cutting blade for lathes, shapers, planers and the like and a holder for supporting such blade either alone or in combination.

What is claimed is:

1. A cutting off tool holder for lathes comprising a base to be adjustably affixed to the lathe block and including a trunnion, a blade holder depending from said trunnion and extending below the lathe block, means to affix said holder in adjusted position on said base, a recessed face on said support of a width to receive a cutting off tool having a depth to width ratio approximating eleven to one, an inwardly inclined seat in said recess to receive the blade, means to engage the top edge of the blade to force the blade into said seat, a face plate spanning said recess and enclosing the blade, and means on said plate to set up against the blade to retain the blade in alignment in said recess.

2. In combination with the turret of a turret type lathe where the turret post is provided with a tool holder slot, a tool holder having a shank to be disposed in said slot, a flange on said shank extending below the base of said slot and spaced from the side of the turret post, a thin deep cutting off blade recess in said flange, and a cutting off blade in said recess of a depth to extend a substantial distance below the base of said slot so that said blade engaging the work at the lathe spindle center elevation will have a ratio of depth to thickness to length of extension from the turret post which will withstand the stresses of the cutting operation.

DAVID S. ANTHONY.

REFERENCES CITED

The following references are of record in the file of this patent:

UNITED STATES PATENTS

| Number | Name | Date |
|---|---|---|
| 1,266,116 | Gibbs | May 14, 1918 |
| 1,063,050 | Matthews | May 27, 1913 |
| 2,328,477 | Leurs | Aug. 31, 1943 |
| 2,243,239 | Zasada | May 27, 1941 |
| 1,222,178 | Browand | Apr. 10, 1917 |
| 1,112,185 | Amborn | Sept. 29, 1914 |
| 517,167 | Pratt | Mar. 27, 1894 |
| 622,625 | Hill | Apr. 4, 1899 |
| 2,223,831 | Leurs | Dec. 30, 1940 |

FOREIGN PATENTS

| Number | Country | Date |
|---|---|---|
| 507,540 | British | June 16, 1939 |